US012614488B2

(12) United States Patent
Hu et al.

(10) Patent No.: US 12,614,488 B2
(45) Date of Patent: Apr. 28, 2026

(54) DRIVING CIRCUIT HAVING FLOATING PROCESSING TRANSISTOR, AND DISPLAY DEVICE

(71) Applicant: BOE TECHNOLOGY GROUP CO., LTD., Beijing (CN)

(72) Inventors: Hehe Hu, Beijing (CN); Hui Guo, Beijing (CN); Jiayu He, Beijing (CN); Ce Ning, Beijing (CN); Zhengliang Li, Beijing (CN); Kun Zhao, Beijing (CN); Nianqi Yao, Beijing (CN); Jie Huang, Beijing (CN); Feifei Li, Beijing (CN); Fengjuan Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 37 days.

(21) Appl. No.: 18/710,493

(22) PCT Filed: Apr. 27, 2023

(86) PCT No.: PCT/CN2023/091262
§ 371 (c)(1),
(2) Date: May 15, 2024

(87) PCT Pub. No.: WO2024/221353
PCT Pub. Date: Oct. 31, 2024

(65) Prior Publication Data

US 2025/0336322 A1 Oct. 30, 2025

(51) Int. Cl.
*G09G 3/20* (2006.01)

(52) U.S. Cl.
CPC .......... *G09G 3/20* (2013.01); *G09G 2300/04* (2013.01); *G09G 2310/0267* (2013.01); *G09G 2310/0286* (2013.01)

(58) Field of Classification Search
CPC ............................................ G09G 2310/0286
See application file for complete search history.

(56) References Cited

U.S. PATENT DOCUMENTS 6,313,502 B1 11/2001 Widdershoven
2013/0088118 A1* 4/2013 Ho ...................... B06B 1/0292
310/300

(Continued)

FOREIGN PATENT DOCUMENTS

CN 103681767 A 3/2014
CN 103730491 A 4/2014

(Continued)

*Primary Examiner* — Bipin Gyawali
(74) *Attorney, Agent, or Firm* — Muncy, Geissler, Olds & Lowe, P.C.

(57) ABSTRACT

A driving circuit and a display device are provided. The driving circuit includes a pull-up node noise reduction circuit, an input circuit, a first output noise reduction circuit and a pull-down node noise reduction circuit; at least one transistor included in the driving circuit is a floating processing transistor including a floating electrode, a gate electrode, a first electrode and a second electrode; the floating electrode is arranged on the same layer with at least one of the first electrodes and the second electrode of the floating processing transistor; the floating electrode is arranged between the first electrode and the second electrode of the floating processing transistor, and the floating electrode has no electric signal input; a shortest distance between the first electrode of the floating processing transistor and the second electrode of the floating processing transistor is greater than an initial distance.

18 Claims, 8 Drawing Sheets

(56) References Cited

U.S. PATENT DOCUMENTS

| | | | | |
|---|---|---|---|---|
| 2016/0218707 | A1* | 7/2016 | Park | G11C 19/28 |
| 2020/0020410 | A1* | 1/2020 | Du | G11C 19/28 |
| 2020/0058362 | A1* | 2/2020 | Xu | G09G 3/20 |
| 2021/0335317 | A1* | 10/2021 | Liu | G09G 3/3674 |
| 2022/0108657 | A1* | 4/2022 | Feng | G09G 3/3677 |
| 2022/0415276 | A1* | 12/2022 | Ma | G09G 3/3677 |
| 2023/0162637 | A1* | 5/2023 | Liu | G09G 3/3677<br>345/214 |
| 2025/0252930 | A1* | 8/2025 | Kim | G09G 3/3266 |

FOREIGN PATENT DOCUMENTS

| | | | |
|---|---|---|---|
| CN | 104124269 | A | 10/2014 |
| CN | 105518771 | A | 4/2016 |
| CN | 105047228 | B | 11/2018 |
| CN | 108806628 | A | 11/2018 |
| CN | 110491328 | A | 11/2019 |
| CN | 112634974 | A | 4/2021 |
| CN | 113327537 | A | 8/2021 |
| CN | 113724636 | A | 11/2021 |
| CN | 215577702 | U | 1/2022 |
| CN | 216388720 | U | 4/2022 |
| CN | 115050305 | A | 9/2022 |
| WO | WO2023028839 | A1 | 3/2023 |

* cited by examiner

DRIVING CIRCUIT HAVING FLOATING PROCESSING TRANSISTOR, AND DISPLAY DEVICE

CROSS REFERENCE TO RELATED APPLICATIONS

This application is a U.S. national phase of PCT Application No. PCT/CN2023/091262 filed on Apr. 27, 2023, the entire contents of which are hereby incorporated by reference.

TECHNICAL FIELD

The present disclosure relates to the field of display technology, in particular to a driving circuit and a display device.

BACKGROUND

In the related art, high-mobility Gate On Array (GOA, a gate driving circuit provided on the array substrate) has the problem of insufficient output high voltage or no output. High-mobility GOA has the problem of multiple outputs and the output curve low-voltage floating.

SUMMARY

In one aspect, the present disclosure provides in some embodiments a driving circuit, including a pull-up node noise reduction circuit, an input circuit, a first output noise reduction circuit and a pull-down node noise reduction circuit; wherein the pull-up node noise reduction circuit is electrically connected to a pull-up node, a pull-up node noise reduction control terminal and a first voltage terminal, and the pull-up node noise reduction circuit is configured to control to connect the pull-up node and the first voltage terminal under the control of a pull-up node noise reduction control signal provided by the pull-up node noise reduction control terminal; the input circuit is electrically connected to an input terminal and the pull-up node respectively, and is configured to control a potential of the pull-up node under the control of an input signal provided by the input terminal; the first output noise reduction circuit is electrically connected to a pull-down node, an output terminal and a second voltage terminal respectively, and is configured to connect the output terminal and the second voltage terminal under the control of a potential of the pull-down node; the pull-down node noise reduction circuit is electrically connected to the pull-down node, the pull-down node noise reduction control terminal and a third voltage terminal respectively, and is configured to control to connect the pull-down node and the third voltage terminal under the control of a pull-down node noise reduction control signal provided by the pull-down node noise reduction control terminal; at least one transistor included in the driving circuit is a floating processing transistor, the floating processing transistor includes a floating electrode, a gate electrode, a first electrode and a second electrode; the floating electrode and at least one of the first electrode and the second electrode of the floating processing transistor are arranged in a same layer; the floating electrode is arranged between the first electrode and the second electrode of the floating processing transistor, and the floating electrode has no electrical signal input; a shortest distance between the first electrode of the floating processing transistor and the second electrode of the floating processing transistor is greater than an initial distance.

Optionally, at least one of the pull-up node noise reduction circuit, the input circuit, the first output noise reduction circuit, and the pull-down node noise reduction circuit includes the floating process transistor, the floating processing transistor includes A floating electrodes, A is greater than or equal to 1 and less than or equal to 3.

Optionally, the floating electrode, the first electrode and the second electrode of the floating processing transistor are located together on a first metal layer; a shortest distance between the first electrode and the second electrode is greater than or equal to a first distance and less than or equal to a second distance; the first distance is a difference between the initial distance and 3 um, and the second distance is a sum of the initial distance and 3 um.

Optionally, the output terminal is a carry signal output terminal; the input terminal is an adjacent previous M stage of carry signal output terminal, and M is a positive integer.

Optionally, the output terminal is a driving signal output terminal; the input terminal is an adjacent previous M stage of driving signal output terminal, and M is a positive integer.

Optionally, the pull-down node includes a first pull-down node and a second pull-down node; the pull-up node noise reduction control terminal includes the first pull-down node, the second pull-down node, a reset terminal and a frame reset terminal; the reset terminal is an adjacent next N stage of carry signal output terminal, N is a positive integer; the pull-up node noise reduction circuit includes a first transistor, a second transistor, a third transistor and a fourth transistor; a gate electrode of the first transistor is electrically connected to the first pull-down node, a first electrode of the first transistor is electrically connected to the pull-up node, and a second electrode of the first transistor is electrically connected to the first voltage terminal; a gate electrode of the second transistor is electrically connected to the second pull-down node, a first electrode of the second transistor is electrically connected to the pull-up node, and a second electrode of the second transistor is electrically connected to the first voltage terminal; a gate electrode of the third transistor is electrically connected to the reset terminal, a first electrode of the third transistor is electrically connected to the pull-up node, and a second electrode of the third transistor is electrically connected to the first voltage terminal; a gate electrode of the fourth transistor is electrically connected to the frame reset terminal, a first electrode of the fourth transistor is electrically connected to the pull-up node, and a second electrode of the fourth transistor is electrically connected to the first voltage terminal; at least one of the first transistor, the second transistor, the third transistor, and the fourth transistor is a floating processing transistor.

Optionally, the pull-down node includes a first pull-down node and a second pull-down node; the pull-up node noise reduction control terminal includes the first pull-down node, the second pull-down node, a reset terminal and an frame reset terminal; the reset terminal is an adjacent next N stage of driving signal output terminal, N is a positive integer; the pull-up node noise reduction circuit includes a first transistor, a second transistor, a third transistor and a fourth transistor; a gate electrode of the first transistor is electrically connected to the first pull-down node, a first electrode of the first transistor is electrically connected to the pull-up node, and a second electrode of the first transistor is electrically connected to the first voltage terminal; a gate electrode of the second transistor is electrically connected to the second pull-down node, a first electrode of the second transistor is electrically connected to the pull-up node, and a second electrode of the second transistor is electrically connected to the first voltage terminal; a gate electrode of the third transistor is electrically connected to the reset terminal, a first electrode of the third transistor is electrically connected to the pull-up node, and a second electrode of the third transistor is electrically connected to the first voltage terminal; a gate electrode of the fourth transistor is electrically connected to the frame reset terminal, a first electrode of the fourth transistor is electrically connected to the pull-up node, and a second electrode of the fourth transistor is electrically connected to the first voltage terminal; at least one of the first transistor, the second transistor, the third transistor, and the fourth transistor is a floating processing transistor.

Optionally, the input circuit includes a fifth transistor; a gate electrode of the fifth transistor and a first electrode of the fifth transistor are both electrically connected to the input terminal, and a second electrode of the fifth transistor is electrically connected to the pull-up node; the fifth transistor is a floating processing transistor.

Optionally, the first output noise reduction circuit includes a sixth transistor and a seventh transistor; a gate electrode of the sixth transistor is electrically connected to the first pull-down node, a first electrode of the sixth transistor is electrically connected to the output terminal, and a second electrode of the sixth transistor is electrically connected to the second voltage terminal; a gate electrode of the seventh transistor is electrically connected to the second pull-down node, a first electrode of the seventh transistor is electrically connected to the output terminal, and a second electrode of the seventh transistor is electrically connected to the second voltage terminal; at least one of the sixth transistor and the seventh transistor is a floating processing transistor.

Optionally, the pull-down node noise reduction circuit includes an eighth transistor, a ninth transistor, a tenth transistor, and an eleventh transistor; the pull-down node includes a first pull-down node and a second pull-down node; the pull-down node noise reduction control terminal includes a pull-up node and an input terminal; a gate electrode of the eighth transistor is electrically connected to the pull-up node, a first electrode of the eighth transistor is electrically connected to the first pull-down node, and a second electrode of the eighth transistor is electrically connected to the third voltage terminal; a gate electrode of the ninth transistor is electrically connected to the input terminal, a first electrode of the ninth transistor is electrically connected to the first pull-down node, and a second electrode of the ninth transistor is electrically connected to the third voltage terminal; a gate electrode of the tenth transistor is electrically connected to the pull-up node, a first electrode of the tenth transistor is electrically connected to the second pull-down node, and a second electrode of the tenth transistor is electrically connected to the third voltage terminal; a gate electrode of the eleventh transistor is electrically connected to the input terminal, a first electrode of the eleventh transistor is electrically connected to the second pull-down node, and a second electrode of the eleventh transistor is electrically connected to the third voltage terminal; at least one of the eighth transistor, the ninth transistor, the tenth transistor, and the eleventh transistor is a floating processing transistor.

Optionally, the driving circuit further includes a second output noise reduction circuit, an output circuit and a pull-down node control circuit; wherein the second output noise reduction circuit is electrically connected to the first pull-down node, the second pull-down node, the driving signal output terminal and the fourth voltage terminal respectively, and is configured to control to connect the driving signal output terminal and a fourth voltage terminal under the control of the potential of the first pull-down node, and control to connect the driving signal output terminal and the fourth voltage terminal under the control of the potential of the second pull-down node; the pull-down node control circuit is electrically connected to the first pull-down node and the second pull-down node respectively, and is configured to control the potential of the first pull-down node and the potential of the second pull-down node; the output circuit is electrically connected to the pull-up node, the first clock signal terminal, the carry signal output terminal and the driving signal output terminal respectively, and is configured to control to connect the carry signal output terminal and the first clock signal terminal and control to connect the driving signal output terminal and the first clock signal terminal under the control of the potential of the pull-up node.

Optionally, the driving circuit further includes an output circuit and a pull-down node control circuit; wherein the pull-down node control circuit is electrically connected to the first pull-down node and the second pull-down node respectively, and is configured to control the potential of the first pull-down node and the potential of the second pull-down node; the output circuit is electrically connected to the pull-up node, the first clock signal terminal and the driving signal output terminal respectively, and is configured to control to connect the driving signal output terminal and the first clock signal terminal under the control of the potential of the pull-up node.

Optionally, the pull-down node control circuit is further electrically connected to the first control voltage terminal and the second control voltage terminal, respectively, is configured to control to connect the first pull-down node and the first control voltage terminal under the control of the first control voltage provided by the first control voltage terminal, and control to connect the second pull-down node and the second control voltage terminal under the control of the second control voltage provided by the second control voltage terminal.

Optionally, the pull-down node control circuit is further electrically connected to the first clock signal terminal and the second clock signal terminal respectively, is configured to control to connect the first pull-down node and the second clock signal terminal under the control of the second clock signal provided by the second clock signal terminal, and control to connect the second pull-down node and the first clock signal terminal under the control of the first clock signal provided by the first clock signal terminal.

In a second aspect, an embodiment of the present disclosure provides a display device including the driving circuit.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without making creative efforts fall within the scope of protection of the present disclosure.

The transistors used in all embodiments of the present disclosure may be thin film transistors, field effect transistors, or other devices with the same characteristics. In the embodiment of the present disclosure, in order to distinguish the two electrodes of the transistor except the gate electrode, one electrode is called the first electrode and the other electrode is called the second electrode.

In actual operation, when the transistor is a thin film transistor or a field effect transistor, the first electrode may be a drain electrode, and the second electrode may be a source electrode; or, the first electrode may be a source electrode, the second electrode may be a drain electrode.

Figure 1:
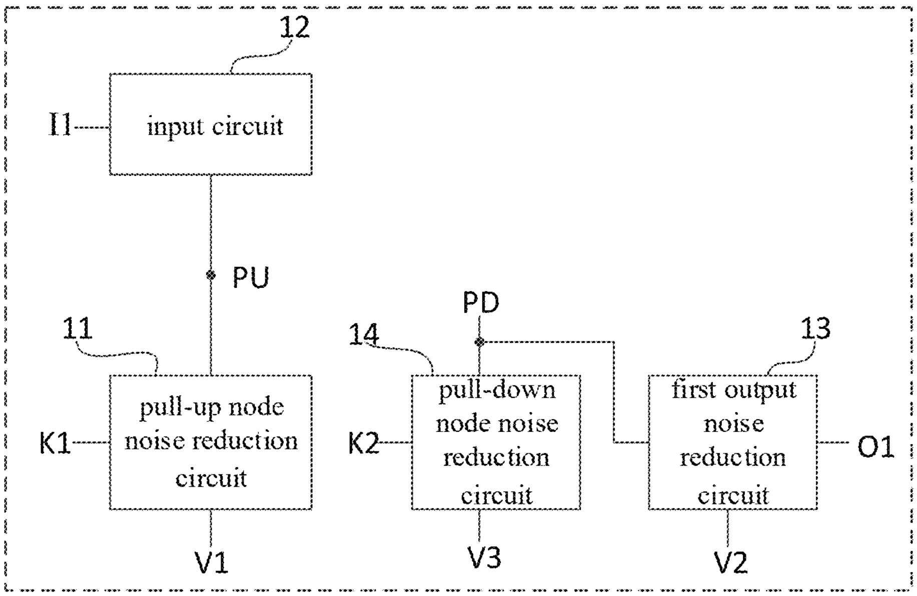
FIG. 1 is a structural diagram of a driving circuit according to at least one embodiment of the present disclosure.

As shown in FIG. 1, the driving circuit according to the embodiment of the present disclosure includes a pull-up node noise reduction circuit 11, an input circuit 12, a first output noise reduction circuit 13 and a pull-down node noise reduction circuit 14;

The pull-up node noise reduction circuit 11 is electrically connected to the pull-up node PU, the pull-up node noise reduction control terminal K1 and the first voltage terminal V1, and the pull-up node noise reduction circuit 11 controls the connection between the pull-up node PU and the first voltage terminal V1 under the control of the pull-up node noise reduction control signal provided by the pull-up node noise reduction control terminal K1;

The input circuit 12 is electrically connected to the input terminal I1 and the pull-up node PU respectively, and is configured to control the potential of the pull-up node PU under the control of the input signal provided by the input terminal I1;

The first output noise reduction circuit 13 is electrically connected to the pull-down node PD, the output terminal O1 and the second voltage terminal V2 respectively, and is configured to connect the output terminal O1 and the second voltage terminal V2 under the control of the potential of the pull-down node PD;

The pull-down node noise reduction circuit 14 is electrically connected to the pull-down node PD, the pull-down node noise reduction control terminal K2 and the third voltage terminal V3 respectively, and is configured to control to connect the pull-down node PD and the third voltage terminal V3 under the control of the pull-down node noise reduction control signal provided by the pull-down node noise reduction control terminal K2;

At least one transistor included in the driving circuit is a floating processing transistor. The floating processing transistor includes a floating electrode, a gate electrode, a first electrode and a second electrode; the floating electrode and at least one of the first electrode and the second electrode of the floating processing transistor are arranged in the same layer; the floating electrode is arranged between the first electrode and the second electrode of the floating processing transistor, and the floating electrode has no electrical signal input; the shortest distance between the first electrode of the floating processing transistor and the second electrode of the floating processing transistor is greater than an initial distance.

In at least one embodiment of the present disclosure, the floating electrode having no-electrical signal input means that the floating electrode is in a floating state, that is, structurally disconnected or islanded, or it may also mean that the floating electrode is structurally connected, but no signal input.

In at least one embodiment of the present disclosure, the first voltage terminal, the second voltage terminal and the third voltage terminal may all be low voltage terminals.

In the driving circuit according to at least one embodiment of the present disclosure, in the floating processing transistor, the shortest distance between the first electrode and the second electrode is greater than the initial distance, so as to increase the threshold voltage of the floating processing transistor, and a floating electrode is provided between the first electrode and the second electrode, and the floating electrode has no signal input, so that within a unit area, the metal density on the first metal layer (the first electrode, the second electrode and the floating electrode are jointly located on the first metal layer) does not change much.

In at least one embodiment of the present disclosure, the initial distance may be the shortest distance between the first electrode of the transistor and the second electrode of the transistor when the source-drain floating process is not performed on the transistor; optionally, the first electrode may be a source electrode, and the second electrode may be a drain electrode.

Figure 2:
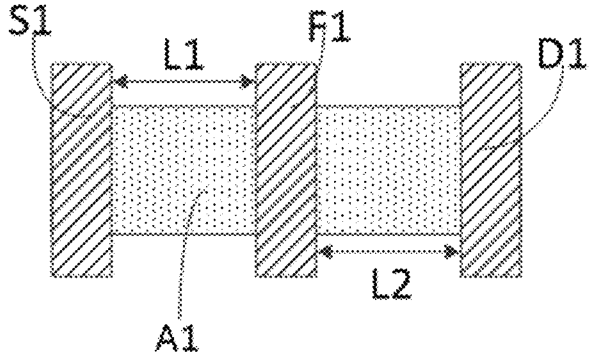
FIG. 2 is a structural diagram of a floating processing transistor according to at least one embodiment of the present disclosure.

As shown in FIG. 2, S1 is the first electrode of the floating processing transistor, D1 is the second electrode of the floating processing transistor, F1 is the floating electrode of the floating processing transistor, and A1 is the active layer pattern of the floating processing transistor;

The floating electrode does not receive any electrical signal, and the floating electrode is in a floating state.

As shown in FIG. 2, the channel length of the floating processing transistor is longer, so the threshold voltage of the floating processing transistor becomes larger.

And the first metal layer can be a source-drain metal layer. After the source-drain metal layer is produced, a passivation layer needs to be produced. Plasma treatment will be used when producing the passivation layer. In order to make the effect of the plasma treatment on the source layer is roughly the same as when the source-drain floating process is not performed on the transistor. Therefore, it is necessary to ensure that the metal density of the first metal layer (the first electrode, the second electrode and the floating electrode are jointly located on the first metal layer) does not change much.

In at least one embodiment of the present disclosure, at least one of the pull-up node noise reduction circuit, the input circuit, the first output noise reduction circuit, and the pull-down node noise reduction circuit includes the floating process transistor, the floating processing transistor includes A floating electrodes, A is greater than or equal to 1 and less than or equal to 3.

In specific implementation, the number of floating electrodes included in the floating processing transistor may be greater than or equal to 1 and less than or equal to 3, but is not limited to this.

In at least one embodiment of the present disclosure, the floating electrode, the first electrode and the second electrode of the floating processing transistor are located together on the first metal layer;

The shortest distance between the first electrode and the second electrode is greater than or equal to the first distance and less than or equal to the second distance;

The first distance is the difference between the initial distance L0 and 3 um, and the second distance is the sum of the initial distance L0 and 3 um.

In specific implementation, on the first metal layer, the shortest distance between two adjacent electrodes may be greater than or equal to the first distance and less than or equal to the second distance.

As shown in FIG. 2, the shortest distance between S1 and F1 is L1, the shortest distance between F1 and D1 is L2, L1 is greater than or equal to the first distance and less than the second distance, L2 is greater than or equal to the first distance and less than or equal to the second distance.

In at least one embodiment of the present disclosure, the driving circuit may be arranged on the base substrate, the shortest distance between two electrodes may refer to: the shortest distance between orthographic projections of two adjacent electrodes on the base substrate;

The shortest distance between S1 and F1 may refer to: the shortest distance between the orthographic projection of S1 on the base substrate and the orthographic projection of F1 on the base substrate;

The shortest distance between F1 and D1 may refer to the shortest distance between the orthographic projection of F1 on the base substrate and the orthographic projection of D1 on the base substrate.

In a specific implementation, when two floating electrodes are provided between the first electrode and the second electrode, the first electrode, the first floating electrode, the second floating electrode and the second electrode are arranged subsequently from left to right, the shortest distance between the two floating electrodes is greater than or equal to the first distance and less than or equal to the second distance, and the shortest distance between the first electrode and the first floating electrode is greater than or equal to the first distance and less than or equal to the second distance. The shortest distance between the second floating electrode and the second electrode is greater than or equal to the first distance and less than or equal to the second distance.

Optionally, the output terminal is a carry signal output terminal;

The input terminal is the carry signal output terminal of the adjacent previous M stages, and M is a positive integer.

In specific implementation, the output terminal may be a carry signal output terminal, and the input terminal may be an adjacent previous M stages of carry signal output terminal.

Optionally, the output terminal is a driving signal output terminal;

The input terminal is an adjacent previous M stages of driving signal output terminals, and M is a positive integer.

In specific implementation, the output terminal may be a driving signal output terminal, and the input terminal may be an adjacent previous M stages of driving signal output terminal.

In at least one embodiment of the present disclosure, the pull-down node may include a first pull-down node and a second pull-down node; the pull-up node noise reduction control end may include the first pull-down node, the second pull-down node, a reset terminal and a frame reset terminal; the reset terminal is the adjacent next N stage of carry signal output terminal, N is a positive integer;

The pull-up node noise reduction circuit includes a first transistor, a second transistor, a third transistor and a fourth transistor;

- a gate electrode of the first transistor is electrically connected to the first pull-down node, a first electrode of the first transistor is electrically connected to the pull-up node, and a second electrode of the first transistor is electrically connected to the first voltage terminal;
- a gate electrode of the second transistor is electrically connected to the second pull-down node, a first electrode of the second transistor is electrically connected to the pull-up node, and a second electrode of the second transistor is electrically connected to the first voltage terminal;
- a gate electrode of the third transistor is electrically connected to the reset terminal, a first electrode of the third transistor is electrically connected to the pull-up node, and a second electrode of the third transistor is electrically connected to the first voltage terminal;
- a gate electrode of the fourth transistor is electrically connected to the frame reset terminal, a first electrode of the fourth transistor is electrically connected to the pull-up node, and a second electrode of the fourth transistor is electrically connected to the first voltage terminal;

At least one of the first transistor, the second transistor, the third transistor, and the fourth transistor is a floating processing transistor.

In specific implementation, the pull-up node noise reduction circuit may include a first transistor, a second transistor, a third transistor and a fourth transistor, the reset terminal may be an adjacent next N stage of carry signal output terminal, and the at least one of the first transistor, the second transistor, the third transistor, and the fourth transistor is a floating processing transistor.

In at least one embodiment of the present disclosure, the pull-down node includes a first pull-down node and a second pull-down node; the pull-up node noise reduction control terminal includes the first pull-down node, the second pull-down node, the reset terminal and the frame reset terminal; the reset terminal is the adjacent next N stage of driving signal output terminal, N is a positive integer;

The pull-up node noise reduction circuit includes a first transistor, a second transistor, a third transistor and a fourth transistor;

a gate electrode of the first transistor is electrically connected to the first pull-down node, a first electrode of the first transistor is electrically connected to the pull-up node, and a second electrode of the first transistor is electrically connected to the first voltage terminal;

a gate electrode of the second transistor is electrically connected to the second pull-down node, a first electrode of the second transistor is electrically connected to the pull-up node, and a second electrode of the second transistor is electrically connected to the first voltage terminal;

a gate electrode of the third transistor is electrically connected to the reset terminal, a first electrode of the third transistor is electrically connected to the pull-up node, and a second electrode of the third transistor is electrically connected to the first voltage terminal;

a gate electrode of the fourth transistor is electrically connected to the frame reset terminal, a first electrode of the fourth transistor is electrically connected to the pull-up node, and a second electrode of the fourth transistor is electrically connected to the first voltage terminal;

At least one of the first transistor, the second transistor, the third transistor, and the fourth transistor is a floating processing transistor.

In specific implementation, the pull-up node noise reduction circuit may include a first transistor, a second transistor, a third transistor and a fourth transistor, the reset terminal may be an adjacent next N stage of driving signal output terminal, and at least one of the first transistor, the second transistor, the third transistor, and the fourth transistor is a floating processing transistor.

Figure 3:
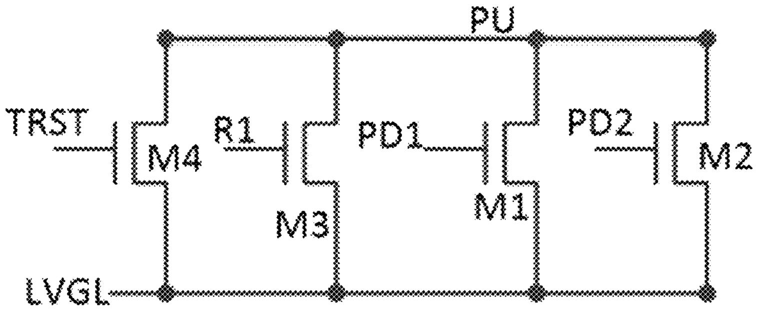
FIG. 3 is a circuit diagram of a pull-up node noise reduction circuit according to at least one embodiment of the present disclosure.

As shown in FIG. 3, the pull-up node noise reduction circuit includes a first transistor M1, a second transistor M2, a third transistor M3 and a fourth transistor M4;

The gate electrode of the first transistor M1 is electrically connected to the first pull-down node PDT, the first electrode of the first transistor M1 is electrically connected to the pull-up node PU, and the second electrode of the first transistor M1 is electrically connected to the first low voltage terminal LVGL;

The gate electrode of the second transistor M2 is electrically connected to the second pull-down node PD2, the first electrode of the second transistor M2 is electrically connected to the pull-up node PU, and the second electrode of the second transistor M2 is electrically connected to the first low voltage terminal LVGL;

The gate electrode of the third transistor M3 is electrically connected to the reset terminal R1, the first electrode of the third transistor M3 is electrically connected to the pull-up node PU, and the second electrode of the third transistor M3 is electrically connected to the first low voltage terminal LVGL;

The gate electrode of the fourth transistor M4 is electrically connected to the frame reset terminal TRST, the first electrode of the fourth transistor M4 is electrically connected to the pull-up node PU, and the second electrode of the fourth transistor M4 is electrically connected to the first low voltage terminal LVGL;

At least one of the first transistor M1, the second transistor M2, the third transistor M3, and the fourth transistor M4 may be a floating processing transistor.

Optionally, the first voltage terminal may be a first low voltage terminal, but is not limited thereto.

In at least one embodiment shown in FIG. 3, the reset terminal may be an adjacent next N stage of carry signal output terminal or an adjacent next N stage of driving signal output terminal, and N is a positive integer.

Optionally, the transistors included in the pull-up node noise reduction circuit may be high-mobility oxide thin film transistors (TFTs), but are not limited to this.

Figure 4:
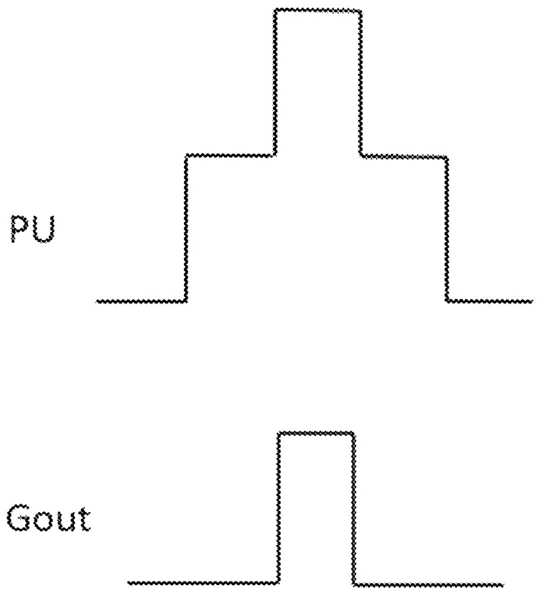
FIG. 4 is a waveform diagram of the voltage of the pull-up node PU and a waveform diagram of the driving signal provided by the driving signal output terminal Gout after the source-drain floating process is performed on the transistor included in the pull-up node noise reduction circuit.

In at least one embodiment of the present disclosure, the transistors included in the pull-up node noise reduction circuit are subjected to source-drain floating processing to solve the problem that the voltage of the pull-up node is pulled down by the first low voltage signal provided by the first low voltage terminal, thereby improving the problem of insufficient high voltage output and no output of high-mobility GOA. As shown in FIG. 4, after the source-drain floating process is performed on the transistors included in the pull-up node noise reduction circuit, the voltage of the pull-up node PU and the driving signal provided by the driving signal output terminal Gout are normal.

During specific implementation, when the transistors included in the pull-up node noise reduction circuit are turned off, their gate-source voltages are greater than or equal to 0V. In the related art, the threshold voltage of high-mobility oxide TFTs is about 0V, and sub-threshold swing (SS) is small, when the threshold voltage of the transistor included in the pull-up node noise reduction circuit shifts negatively by 0.5V, it will cause the current of the transistor included in the pull-up node noise reduction circuit increases by an order of magnitude when the gate-source voltage is equal to 0V. Based on this, at least one embodiment of the present disclosure performs source-drain floating processing on the transistors included in the pull-up node noise reduction circuit, so as to increase the threshold voltage of the transistors included in the pull-up node noise reduction circuit, so that the threshold voltage of the transistor included in the pull-up node noise reduction circuit is greater than 0, thereby ensuring a good off state when the gate-source voltage of the transistor included in the pull-up node noise reduction circuit is 0V, the leakage current of transistors with source-drain floating processing is more than 5 orders of magnitude smaller than the leakage current of transistors without source-drain floating processing.

Optionally, the input circuit includes a fifth transistor;

a gate electrode of the fifth transistor and a first electrode of the fifth transistor are both electrically connected to the input terminal, and a second electrode of the fifth transistor is electrically connected to the pull-up node;

The fifth transistor is a floating processing transistor.

Figure 5:
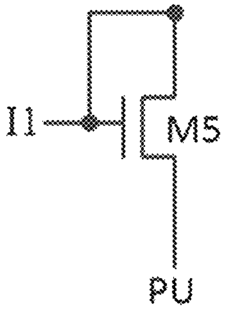
FIG. 5 is a circuit diagram of the input circuit according to at least one embodiment of the present disclosure.

As shown in FIG. 5, the input circuit includes a fifth transistor M5;

The gate electrode of the fifth transistor M5 and the first electrode of the fifth transistor M5 are both electrically connected to the input terminal I1, and the second electrode of the fifth transistor is electrically connected to the pull-up node PU;

The fifth transistor M5 may be a floating processing transistor.

In at least one embodiment of the present disclosure, the input terminal may be adjacent previous M stage of carry signal output terminal or adjacent previous M stage of driving signal output terminal, where M is a positive integer.

Optionally, the transistors included in the input circuit may be high-mobility oxide TFTs, but are not limited to this.

In at least one embodiment of the present disclosure, the source-drain floating process is performed on the transistors included in the input circuit to solve the problem that the voltage of the pull-up node is pulled down by the low voltage provided by the input terminal, thereby improving the high mobility GOA outputs insufficient high voltage and has no output problem. As shown in FIG. 4, after the source-drain floating process is performed on the transistors included in the input circuit, the voltage of the pull-up node PU and the driving signal provided by the driving signal output terminal Gout are normal.

In specific implementation, when the transistors included in the input circuit are turned off, their gate-source voltages are greater than or equal to 0V. In the related art, the threshold voltage of high-mobility oxide TFTs is about 0V, and SS is small, when the threshold voltage of the transistor included in the input circuit shifts negatively by 0.5V, it will cause the current of the transistor included in the input circuit to increase by one order of magnitude when the gate-source voltage is equal to 0V. Based on this, in at least one embodiment discloses, the source-drain floating processing is performed on the transistors included in the input circuit to increase the threshold voltage of the transistors included in the input circuit, so that the threshold voltage of the transistors included in the input circuit is greater than 0, so that when the gate-source voltage of the transistor included in the input circuit is 0V, it is guaranteed to be in a good off state, and the leakage current of the transistor with the source-drain floating treatment is more than 5 orders of magnitude smaller than the leakage current of the transistor without source-drain floating treatment.

Optionally, the first output noise reduction circuit includes a sixth transistor and a seventh transistor;

a gate electrode of the sixth transistor is electrically connected to the first pull-down node, a first electrode of the sixth transistor is electrically connected to the output terminal, and a second electrode of the sixth transistor is electrically connected to the second voltage terminal;

a gate electrode of the seventh transistor is electrically connected to the second pull-down node, a first electrode of the seventh transistor is electrically connected to the output terminal, and a second electrode of the seventh transistor is electrically connected to the second voltage terminal;

At least one of the sixth transistor and the seventh transistor is a floating processing transistor.

Figure 6:
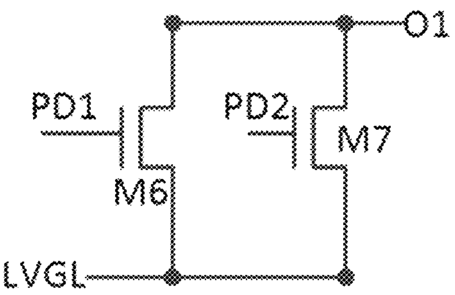
FIG. 6 is a circuit diagram of a first output noise reduction circuit according to at least one embodiment of the present disclosure.

As shown in FIG. 6, at least one embodiment of the first output noise reduction circuit includes a sixth transistor M6 and a seventh transistor M7;

The gate electrode of the sixth transistor M6 is electrically connected to the first pull-down node PD1, the first electrode of the sixth transistor M6 is electrically connected to the output terminal O1, and the second electrode of the sixth transistor M6 is electrically connected to the first low voltage terminal LVGL;

The gate electrode of the seventh transistor M7 is electrically connected to the second pull-down node PD2, the first electrode of the seventh transistor M7 is electrically connected to the output terminal O1, and the second electrode of the seventh transistor M7 is electrically connected to the first low voltage terminal LVGL;

At least one of the sixth transistor M6 and the seventh transistor M7 is a floating processing transistor.

Optionally, the second voltage terminal may be the first low voltage terminal or the second low voltage terminal, but is not limited thereto.

In at least one embodiment shown in FIG. 6, when the driving circuit includes a carry signal output terminal and a driving signal output terminal, the output terminal O1 may be a carry signal output terminal; when the driving circuit only includes a driving signal output terminal, the output terminal O1 may be a driving signal output terminal.

Optionally, the transistors included in the first output noise reduction circuit may be high-mobility oxide TFTs, but are not limited to this.

Figure 7:
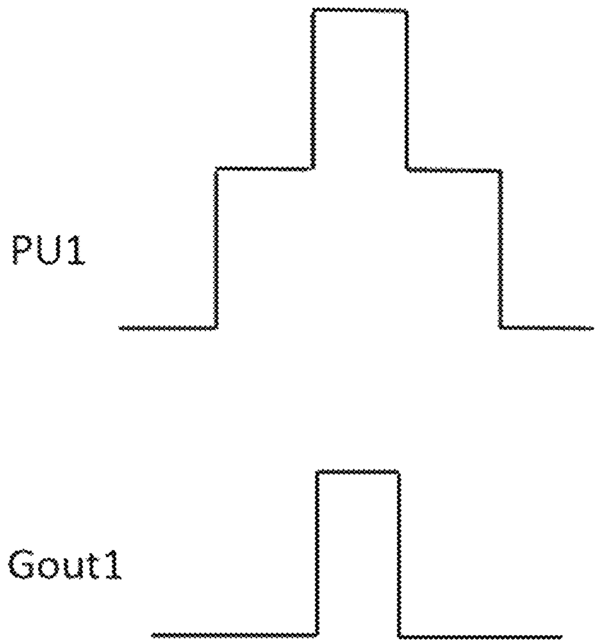
FIG. 7 is a waveform diagram of the voltage of the pull-up node PU1 of the next-stage of driving circuit whose input terminal is electrically connected to the output terminal O1 after the source-drain floating process is performed on the transistor included in the first output noise reduction circuit and a waveform diagram of the driving signal provided by the driving signal output terminal Gout1 of the next-stage of driving circuit electrically connected to the output terminal O1.

In at least one embodiment of the present disclosure, the transistor included in the first output noise reduction circuit is subjected to source-drain floating processing to solve the problem that the high voltage of the output signal provided by the output terminal O1 is pulled down by the first low voltage terminal, so as to solve the problem of insufficient rise of the high-voltage of the pull-up node of the next stage of driving circuit whose input terminal is electrically connected to the output terminal O1. As shown in FIG. 7, after the source-drain floating process is performed on the transistor included in the first output noise reduction circuit, the voltage of the pull-up node PU1 of the next stage of driving circuit whose input terminal is electrically connected to the output terminal O1 and the driving signal provided by the driving signal output terminal Gout1 of the next stage of driving circuit electrically whose input terminal is connected to the output terminal O1 are normal.

In specific implementation, when the transistors included in the first output noise reduction circuit are turned off, their gate-source voltages are both greater than and equal to 0V. In the related art, the threshold voltage of high-mobility oxide TFTs is about 0V, and SS (sub-threshold swing) is small, when the threshold voltage of the transistor included in the first output noise reduction circuit shifts negatively by 0.5V, it will cause the current of the transistor included in the first output noise reduction circuit increases by an order of magnitude when the gate-source voltage is equal to 0V. Based on this, in at least one embodiment of the present disclosure, the source-drain floating processing is performed on the transistors included in the first output noise reduction circuit, so as to increase the threshold voltage of the transistors included in the first output noise reduction circuit, so that the threshold voltage of the transistor included in the first output noise reduction circuit is greater than 0, thereby ensuring a good off state when the gate-source voltage of the transistor included in the first output noise reduction circuit is 0V, the leakage current of the transistor with the source-drain floating treatment is more than 5 orders of magnitude smaller than the leakage current of the transistor without source-drain floating treatment.

In at least one embodiment of the present disclosure, the pull-down node noise reduction circuit includes an eighth transistor, a ninth transistor, a tenth transistor, and an eleventh transistor; the pull-down node includes a first pull-down node and a second pull-down node; the pull-down node noise reduction control terminal includes a pull-up node and an input terminal;

- a gate electrode of the eighth transistor is electrically connected to the pull-up node, a first electrode of the eighth transistor is electrically connected to the first pull-down node, and a second electrode of the eighth transistor is electrically connected to the third voltage terminal;
- a gate electrode of the ninth transistor is electrically connected to the input terminal, a first electrode of the ninth transistor is electrically connected to the first pull-down node, and a second electrode of the ninth transistor is electrically connected to the third voltage terminal;
- a gate electrode of the tenth transistor is electrically connected to the pull-up node, a first electrode of the tenth transistor is electrically connected to the second pull-down node, and a second electrode of the tenth transistor is electrically connected to the third voltage terminal;
- a gate electrode of the eleventh transistor is electrically connected to the input terminal, a first electrode of the eleventh transistor is electrically connected to the second pull-down node, and a second electrode of the eleventh transistor is electrically connected to the third voltage terminal;

At least one of the eighth transistor, the ninth transistor, the tenth transistor, and the eleventh transistor is a floating processing transistor.

Optionally, the transistors included in the pull-down node noise reduction circuit may be high-mobility oxide TFTs, but are not limited to this.

Optionally, the third voltage terminal may be the first low voltage terminal, but is not limited to this.

Figure 8:
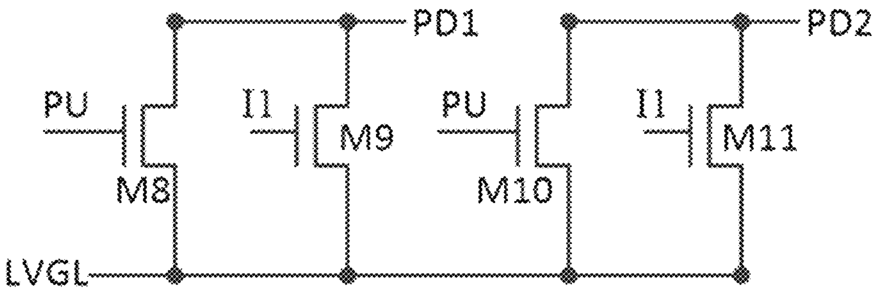
FIG. 8 is a circuit diagram of a pull-down node noise reduction circuit according to at least one embodiment of the present disclosure.

As shown in FIG. 8, the pull-down node noise reduction circuit includes an eighth transistor M8, a ninth transistor M9, a tenth transistor M10, and an eleventh transistor M11; the pull-down node includes a first pull-down node PD1 and a second pull-down node PD2; the pull-down node noise reduction control terminal includes a pull-up node PU and an input terminal I1;

The gate electrode of the eighth transistor M8 is electrically connected to the pull-up node PU, the first electrode of the eighth transistor M8 is electrically connected to the first pull-down node PD1, and the second electrode of the eighth transistor M8 is electrically connected to the first low voltage terminal LVGL;

The gate electrode of the ninth transistor M9 is electrically connected to the input terminal I1, the first electrode of the ninth transistor M9 is electrically connected to the first pull-down node PD1, and the second electrode of the ninth transistor M9 is electrically connected to the first low voltage terminal LVGL;

The gate electrode of the tenth transistor M10 is electrically connected to the pull-up node PU, the first electrode of the tenth transistor M10 is electrically connected to the second pull-down node PD2, and the second electrode of the tenth transistor M10 is electrically connected to the first low voltage terminal LVGL;

The gate electrode of the eleventh transistor M11 is electrically connected to the input terminal I1, the first electrode of the eleventh transistor M11 is electrically connected to the second pull-down node PD2, and the second electrode of the eleventh transistor M11 is electrically connected to the first low voltage terminal LVGL;

At least one of the eighth transistor M8, the ninth transistor M9, the tenth transistor M10, and the eleventh transistor M11 is a floating processing transistor.

Figure 9:
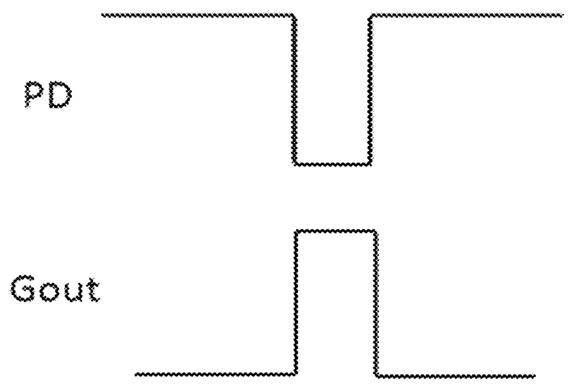
FIG. 9 is a waveform diagram of the voltage of the pull-down node PD and the waveform diagram of the driving signal provided by the driving signal output terminal Gout after the source-drain floating process is performed on the transistor included in the pull-down node noise reduction circuit.

In at least one embodiment of the present disclosure, the source-drain floating process is performed on the transistors included in the pull-down node noise reduction circuit to solve the problem of the high voltage of the pull-down node being pulled down by the first low voltage terminal, thereby improving the problem of multiple outputs of the high mobility GOA and the low-voltage floating of the output curve. As shown in FIG. 9, after the source-drain floating process is performed on the transistors included in the pull-down node noise reduction circuit, the voltage of the pull-down node PD is normal, and the driving signal provided by the driving signal output terminal Gout is normal.

During specific implementation, when the transistors included in the pull-down node noise reduction circuit are turned off, their gate-source voltages are greater than or equal to 0V. In the related art, the threshold voltage of high-mobility oxide TFTs is about 0V, and SS is small, when the threshold voltage of the transistor included in the pull-down node noise reduction circuit shifts negatively by 0.5V, it will cause the current of the transistor included in the pull-down node noise reduction circuit is increased by an order of magnitude when a gate-source voltage is equal to 0V. Based on this, in at least one embodiment of the present disclosure, the source-drain floating processing is performed on the transistors included in the pull-down node noise reduction circuit, so as to increase the threshold voltage of the transistors included in the pull-down node noise reduction circuit, so that the threshold voltage of the transistor included in the pull-down node noise reduction circuit is greater than 0, thereby ensuring a good off state when the gate-source voltage of the transistor included in the pull-down node noise reduction circuit is 0V, the leakage current of the transistor with the source-drain floating treatment is more than 5 orders of magnitude smaller than the leakage current of the transistor without source-drain floating treatment.

In at least one embodiment of the present disclosure, source-drain floating can be performed on the transistors included in the pull-up node noise reduction circuit, the transistors included in the input circuit, the transistors included in the first output noise reduction circuit, and the transistors included in the pull-down node noise reduction circuit, to improve the problem of insufficient high-voltage output and no output of high-mobility GOA, and improve the problem of multiple outputs and low-voltage floating of output curve of high-mobility GOA.

The driving circuit according to at least one embodiment of the present disclosure also includes a second output noise reduction circuit, an output circuit and a pull-down node control circuit;

The second output noise reduction circuit is electrically connected to the first pull-down node, the second pull-down node, the driving signal output terminal and the fourth voltage terminal respectively, and is configured to control to connect the driving signal output terminal and the fourth voltage terminal under the control of the potential of the first pull-down node, and control to connect the driving signal output terminal and the fourth voltage terminal under the control of the potential of the second pull-down node;

The pull-down node control circuit is electrically connected to the first pull-down node and the second pull-down node respectively, and is configured to control the potential of the first pull-down node and the potential of the second pull-down node;

The output circuit is electrically connected to the pull-up node, the first clock signal terminal, the carry signal output terminal and the driving signal output terminal respectively, and is configured to control to connect the carry signal output terminal and the first clock signal terminal and control to connect the driving signal output terminal and the first clock signal terminal under the control of the potential of the pull-up node.

In specific implementation, when the output terminal is a carry signal output terminal, the driving circuit may also include a second output noise reduction circuit, an output circuit and a pull-down node control circuit, and the second output noise reduction circuit is configured to perform noise reduction on the driving signal provided by the driving signal output terminal, the pull-down node control circuit controls the potential of the pull-down node, and the output circuit controls the driving signal output terminal to provide a driving signal.

Optionally, the fourth voltage terminal may be the second low voltage terminal, but is not limited to this.

Figure 10:
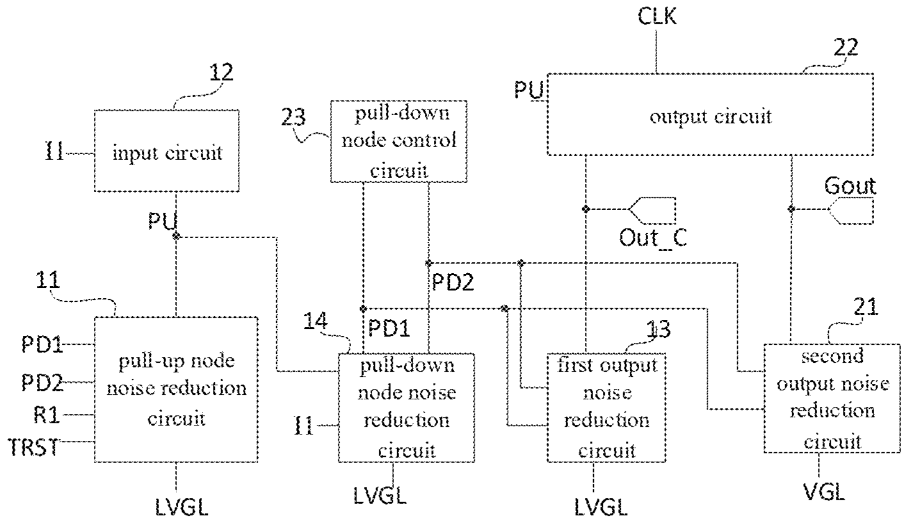
FIG. 10 is a structural diagram of a driving circuit according to at least one embodiment of the present disclosure.

As shown in FIG. 10, based on at least one embodiment of the driving circuit shown in FIG. 1, the output terminal is the carry signal output terminal Out_C; at least one embodiment of the driving circuit also includes a second output noise reduction circuit 21, the output circuit 22 and the pull-down node control circuit 23; the pull-down nodes include a first pull-down node PD1 and a second pull-down node PD2; the first voltage terminal, the second voltage terminal and the third voltage terminal are all first low voltage terminal LVGL;

The pull-up node noise reduction control terminal includes the first pull-down node PDT, the second pull-down node PD2, a reset terminal R1 and a frame reset terminal TRST;

The pull-down node noise reduction control terminal includes a pull-up node PU and an input terminal I1;

The second output noise reduction circuit 21 is electrically connected to the first pull-down node PD1, the second pull-down node PD2, the driving signal output terminal Gout and the second low voltage terminal VGL respectively, and is configured to control to connect the driving signal output terminal Gout and the second low voltage terminal VGL under the control of the potential of the first pull-down node PD1, and control to connect the driving signal output terminal Gout and the second low voltage terminal VGL under the control of the potential of the second pull-down node PD2;

The pull-down node control circuit 23 is electrically connected to the first pull-down node PD1 and the second pull-down node PD2 respectively, and is configured to control the potential of the first pull-down node PD1 and the potential of the second pull-down node PD2;

The output circuit 22 is electrically connected to the pull-up node PU, the first clock signal terminal CLK, the carry signal output terminal Out_C and the driving signal output terminal Gout respectively, and is configured to control to connect the carry signal output terminal Out_C and the first clock signal terminal CLK under the control of the potential of the pull-up node PU, and control to connect the driving signal output terminal Gout and the first clock signal terminal CLK.

Figure 11:
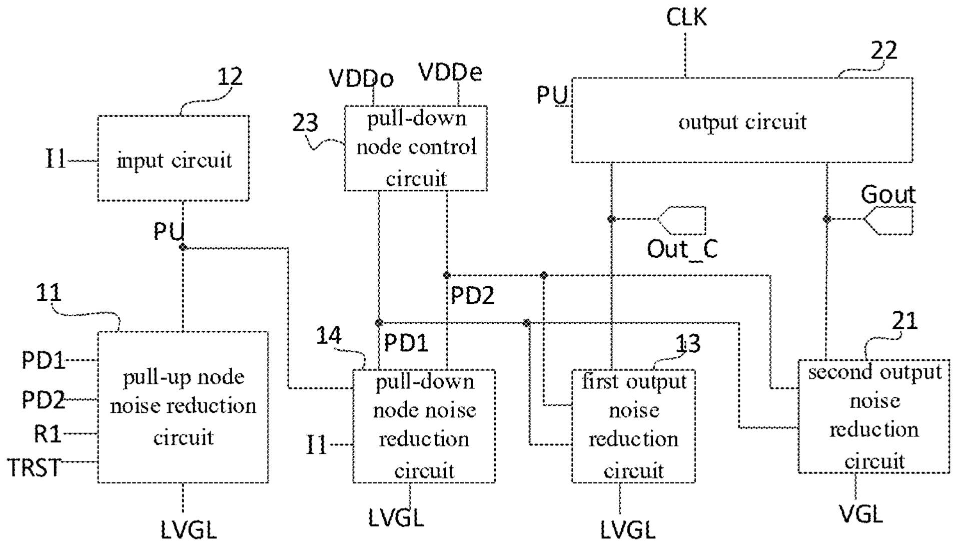
FIG. 11 is a structural diagram of a driving circuit according to at least one embodiment of the present disclosure.

As shown in FIG. 11, based on at least one embodiment of the driving circuit shown in FIG. 10, The pull-down node control circuit 23 may also be electrically connected to the first control voltage terminal VDDo and the second control voltage terminal VDDe, respectively, is configured to control to connect the first pull-down node PD1 and the first control voltage terminal VDDo under the control of the first control voltage provided by the first control voltage terminal VDDo, and control to connect the second pull-down node PD2 and the second control voltage terminal VDDe under the control of the second control voltage provided by the second control voltage terminal VDDe;

When the first control voltage is a high voltage, the second control voltage is a low voltage;

When the first control voltage is a low voltage, the second control voltage is a high voltage.

Figure 12:
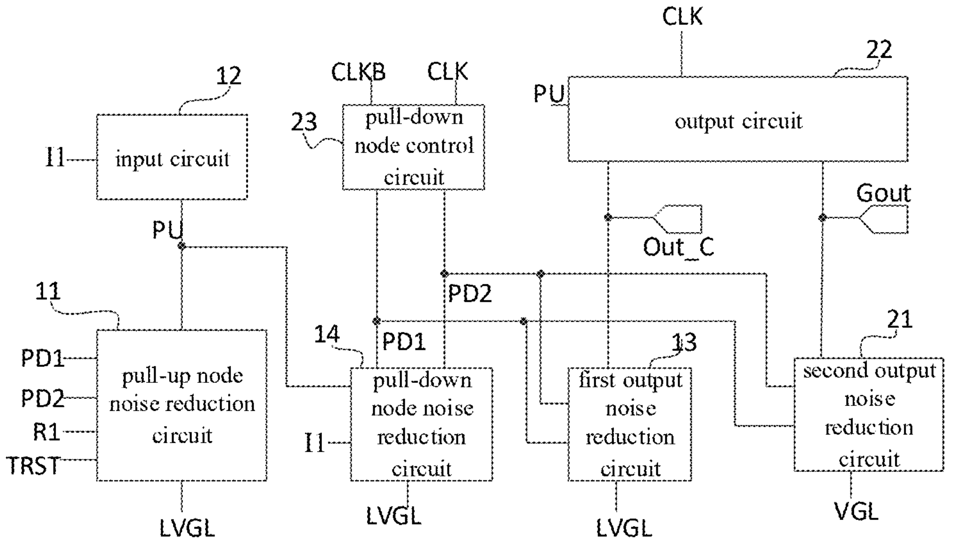
FIG. 12 is a structural diagram of a driving circuit according to at least one embodiment of the present disclosure.

As shown in FIG. 12, based on at least one embodiment of the driving circuit shown in FIG. 10, The pull-down node control circuit 23 can also be electrically connected to the first clock signal terminal CLK and the second clock signal terminal CLKB respectively, is configured to control to connect the first pull-down node PD1 and the second clock signal terminal CLKB under the control of the second clock signal provided by the second clock signal terminal CLKB, and control to connect the second pull-down node PD2 and the first clock signal terminal CLK under the control of the first clock signal provided by the first clock signal terminal CLK.

In at least one embodiment of the present disclosure, the first clock signal may be inverted in phase with the second clock signal.

The driving circuit according to at least one embodiment of the present disclosure further includes an output circuit and a pull-down node control circuit;

The pull-down node control circuit is electrically connected to the first pull-down node and the second pull-down node respectively, and is configured to control the potential of the first pull-down node and the potential of the second pull-down node;

The output circuit is electrically connected to the pull-up node, the first clock signal terminal and the driving signal output terminal respectively, and is configured to control to connect the driving signal output terminal and the first clock signal terminal under the control of the potential of the pull-up node.

In specific implementation, when the output terminal is a driving signal output terminal, the driving circuit according to at least one embodiment of the present disclosure may further include an output circuit and a pull-down node control circuit, and the pull-down node control circuit controls the potential of the first pull-down node and the potential of the second pull-down node, the output circuit controls the driving signal output terminal to provide a driving signal.

Figure 13:
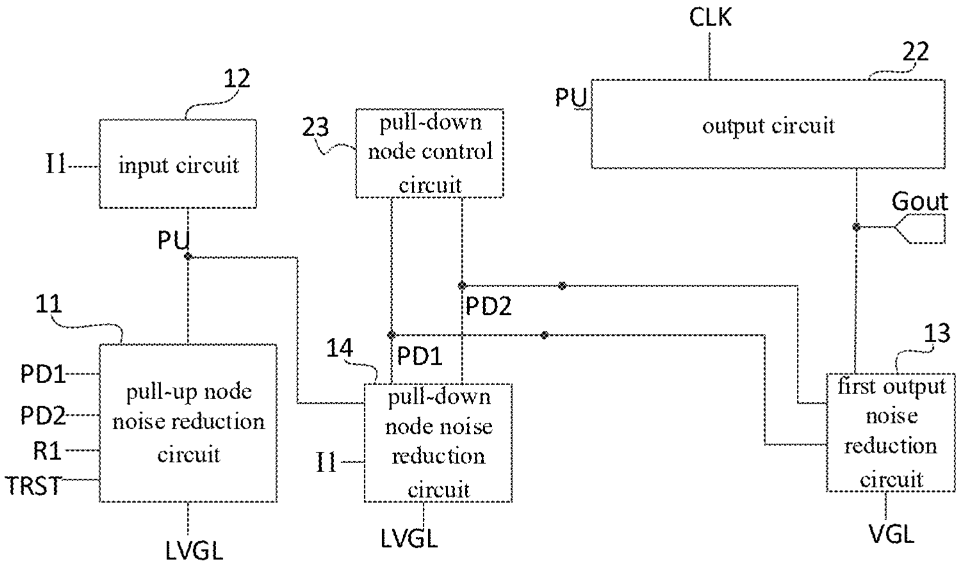
FIG. 13 is a structural diagram of a driving circuit according to at least one embodiment of the present disclosure.

As shown in FIG. 13, based on at least one embodiment of the driving circuit shown in FIG. 1, the output terminal is a driving signal output terminal Gout; the pull-down node includes a first pull-down node PD1 and a second pull-down node PD2; at least one embodiment of the driving circuit further includes an output circuit 22 and a pull-down node control circuit 23; the first voltage terminal and the third voltage terminal are the first low voltage terminal LVGL, and the second voltage terminal is the second low voltage terminal VGL;

The pull-down node control circuit 23 is electrically connected to the first pull-down node PD1 and the second pull-down node PD2 respectively, and is configured to control the potential of the first pull-down node PD1 and the potential of the second pull-down node PD2;

The output circuit 22 is electrically connected to the pull-up node PU, the first clock signal terminal CLK and the driving signal output terminal Gout respectively, and is configured to control to connect the driving signal output terminal Gout and the first clock signal terminal CLK under the control of the potential of the pull-up node PU.

Figure 14:
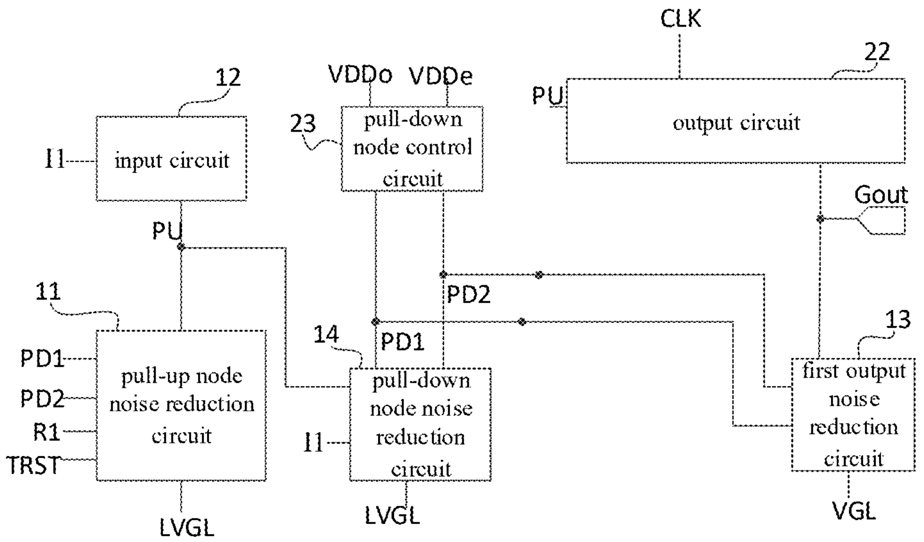
FIG. 14 is a structural diagram of a driving circuit according to at least one embodiment of the present disclosure.

As shown in FIG. 14, based on at least one embodiment of the driving circuit shown in FIG. 13, The pull-down node control circuit 23 may also be electrically connected to the first control voltage terminal VDDo and the second control voltage terminal VDDe, respectively, is configured to control to connect the first pull-down node PD1 and the first control voltage terminal VDDo under the control of the first control voltage provided by the first control voltage terminal VDDo, and control to connect the second pull-down node PD2 and the second control voltage terminal VDDe under the control of the second control voltage provided by the second control voltage terminal VDDe;

When the first control voltage is a high voltage, the second control voltage is a low voltage;

When the first control voltage is a low voltage, the second control voltage is a high voltage.

Figure 15:
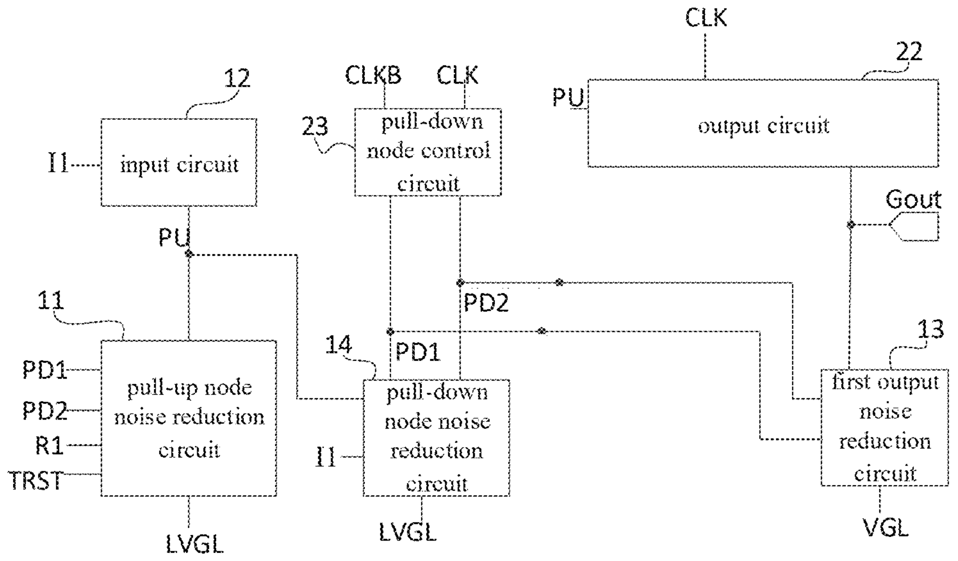
FIG. 15 is a structural diagram of a driving circuit according to at least one embodiment of the present disclosure.

As shown in FIG. 15, based on at least one embodiment of the driving circuit shown in FIG. 13, The pull-down node control circuit 23 can also be electrically connected to the first clock signal terminal CLK and the second clock signal terminal CLKB respectively, is configured to control to connect the first pull-down node PD1 and the second clock signal terminal CLKB under the control of the second clock signal provided by the second clock signal terminal CLKB, and control to connect the second pull-down node PD2 and the first clock signal terminal CLK under the control of the first clock signal provided by the first clock signal terminal CLK.

In at least one embodiment of the present disclosure, the first clock signal may be inverted in phase with the second clock signal.

Figure 16:
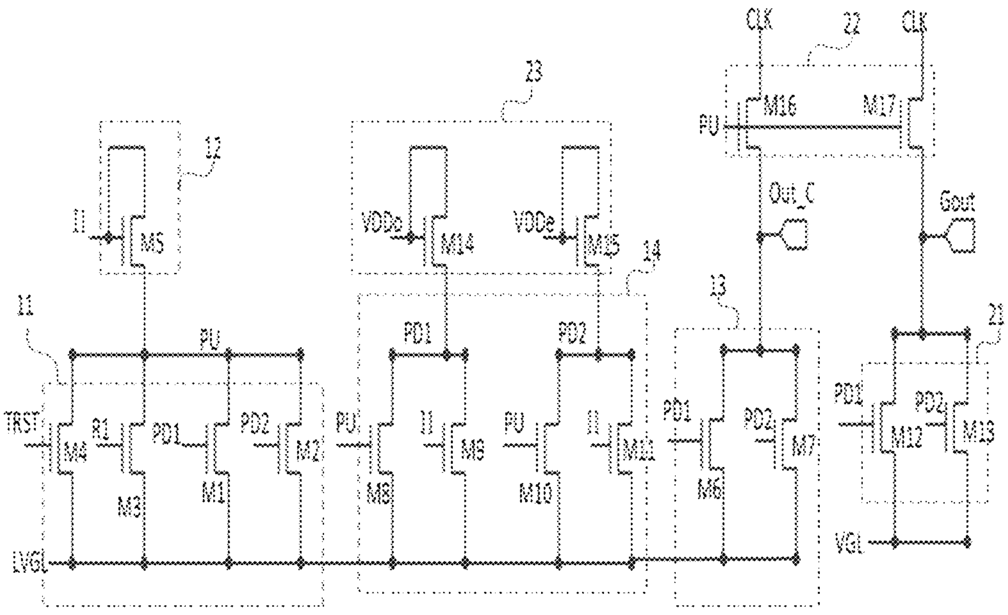
FIG. 16 is a circuit diagram of a driving circuit according to at least one embodiment of the present disclosure.

As shown in FIG. 16, based on at least one embodiment of the driving circuit shown in FIG. 11, The pull-up node noise reduction circuit 11 includes a first transistor M1, a second transistor M2, a third transistor M3 and a fourth transistor M4;

The gate electrode of the first transistor M1 is electrically connected to the first pull-down node PDT, the first electrode of the first transistor M1 is electrically connected to the pull-up node PU, and the second electrode of the first transistor M1 is electrically connected to the first low voltage terminal LVGL;

The gate electrode of the second transistor M2 is electrically connected to the second pull-down node PD2, the first electrode of the second transistor M2 is electrically connected to the pull-up node PU, and the second electrode of the second transistor M2 Electrically connected to the first low voltage terminal LVGL;

The gate electrode of the third transistor M3 is electrically connected to the reset terminal R1, the first electrode of the third transistor M3 is electrically connected to the pull-up node PU, and the second electrode of the third transistor M3 is electrically connected to the first low voltage terminal LVGL;

The gate electrode of the fourth transistor M4 is electrically connected to the frame reset terminal TRST, the first electrode of the fourth transistor M4 is electrically connected to the pull-up node PU, and the second electrode of the fourth transistor M4 is electrically connected to the first low voltage terminal LVGL;

The input circuit 12 includes a fifth transistor M5;

The gate electrode of the fifth transistor M5 and the first electrode of the fifth transistor M5 are both electrically connected to the input terminal I1, and the second electrode of the fifth transistor is electrically connected to the pull-up node PU;

The first output noise reduction circuit 13 includes a sixth transistor M6 and a seventh transistor M7;

The gate electrode of the sixth transistor M6 is electrically connected to the first pull-down node PD1, the first electrode of the sixth transistor M6 is electrically connected to the carry signal output terminal Out_C, and the second electrode of the sixth transistor M6 is electrically connected to the first low voltage terminal LVGL;

The gate electrode of the seventh transistor M7 is electrically connected to the second pull-down node PD2, the first electrode of the seventh transistor M7 is electrically connected to the carry signal output terminal Out_C, and the second electrode of the seventh transistor M7 is electrically connected to the first low voltage terminal LVGL;

The pull-down node noise reduction circuit 14 includes an eighth transistor M8, a ninth transistor M9, a tenth transistor M10, and an eleventh transistor M11; the pull-down node includes a first pull-down node PD1 and a second pull-down node PD2; the pull-down node noise reduction control terminal includes the pull-up node PU and the input terminal I1;

The gate electrode of the eighth transistor M8 is electrically connected to the pull-up node PU, the first electrode of the eighth transistor M8 is electrically connected to the first pull-down node PD1, and the second electrode of the eighth transistor M8 is electrically connected to the first low voltage terminal LVGL;

The gate electrode of the ninth transistor M9 is electrically connected to the input terminal I1, the first electrode of the ninth transistor M9 is electrically connected to the first pull-down node PD1, and the second electrode of the ninth transistor M9 is electrically connected to the first low voltage terminal LVGL;

The gate electrode of the tenth transistor M10 is electrically connected to the pull-up node PU, the first electrode of the tenth transistor M10 is electrically connected to the second pull-down node PD2, and the second electrode of the tenth transistor M10 is electrically connected to the first low voltage terminal LVGL;

The gate electrode of the eleventh transistor M11 is electrically connected to the input terminal I1, the first electrode of the eleventh transistor M11 is electrically connected to the second pull-down node PD2, and the second electrode of the eleventh transistor M11 is electrically connected to the first low voltage terminal LVGL;

The second output noise reduction circuit 21 includes a twelfth transistor M12 and a thirteenth transistor M13;

The gate electrode of the twelfth transistor M12 is electrically connected to the first pull-down node PD1, and the first electrode of the twelfth transistor M12 is electrically connected to the driving signal output terminal Gout, the second electrode of the twelfth transistor M12 is electrically connected to the second low voltage terminal VGL;

The gate electrode of the thirteenth transistor M13 is electrically connected to the second pull-down node PD2, and the first electrode of the thirteenth transistor M13 is electrically connected to the driving signal output terminal Gout, and the second electrode of the thirteenth transistor M13 is electrically connected to the second low voltage terminal VGL;

The pull-down node control circuit 23 includes a fourteenth transistor M14 and a fifteenth transistor M15;

The gate electrode of the fourteenth transistor M14 and the first electrode of the fourteenth transistor M14 are electrically connected to the first control voltage terminal VDDo, and the second electrode of the fourteenth transistor M14 is electrically connected to the pull-up Node PU;

The gate electrode of the fifteenth transistor M15 and the first electrode of the fifteenth transistor M15 are electrically connected to the second control voltage terminal VDDe, and the second electrode of the fifteenth transistor M15 is connected to the pull-up Node PU;

The output circuit 22 includes a sixteenth transistor M16 and a seventeenth transistor M17;

The gate electrode of the sixteenth transistor M16 is electrically connected to the pull-up node PU, and the first electrode of the sixteenth transistor M16 is electrically connected to the first clock signal terminal CLK, the second electrode of the sixteenth transistor M16 is electrically connected to the carry signal output terminal Out_C;

The gate electrode of the seventeenth transistor M17 is electrically connected to the pull-up node PU, and the first electrode of the seventeenth transistor M17 is electrically connected to the first clock signal terminal CLK, the second electrode of the seventeenth transistor M17 is electrically connected to the driving signal output terminal Gout.

In at least one embodiment of the driving circuit shown in FIG. 16, all transistors are n-type transistors, but are not limited to this.

In at least one embodiment of the driving circuit shown in FIG. 16, the source-drain floating processing can be performed on at least one of M1, M2, M3, M4, M5, M6, M7, M8, M9, M10, and M11.

Figure 17:
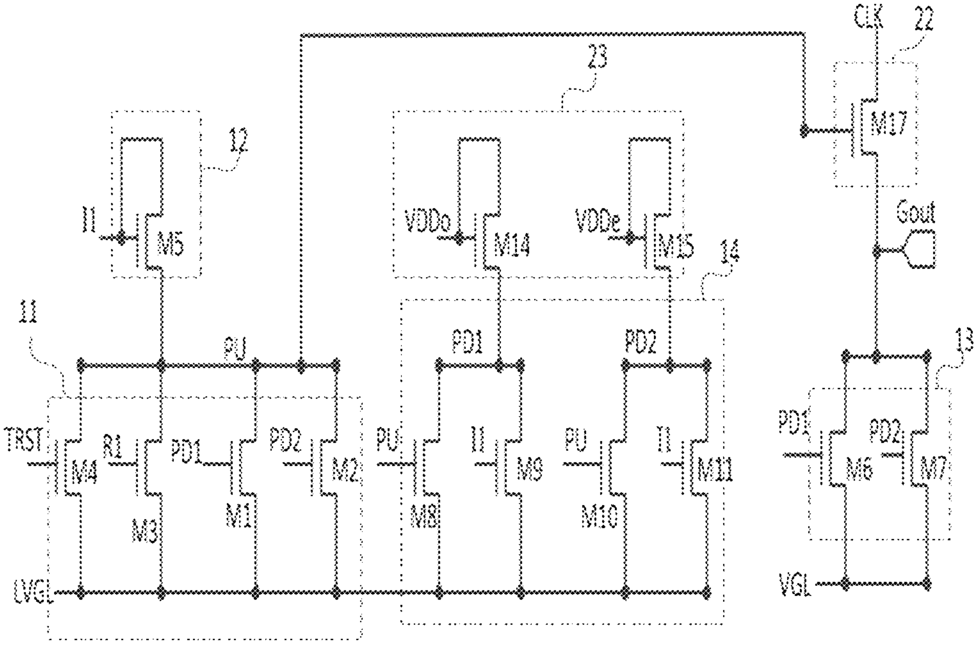
FIG. 17 is a circuit diagram of a driving circuit according to at least one embodiment of the present disclosure.

As shown in FIG. 17, based on at least one embodiment of the driving circuit shown in FIG. 14, The pull-up node noise reduction circuit 11 includes a first transistor M1, a second transistor M2, a third transistor M3 and a fourth transistor M4;

The gate electrode of the first transistor M1 is electrically connected to the first pull-down node PD1, the first electrode of the first transistor M1 is electrically connected to the pull-up node PU, and the second electrode of the first transistor M1 is electrically connected to the first low voltage terminal LVGL;

The gate electrode of the second transistor M2 is electrically connected to the second pull-down node PD2, the first electrode of the second transistor M2 is electrically connected to the pull-up node PU, and the second electrode of the second transistor M2 is electrically connected to the first low voltage terminal LVGL;

The gate electrode of the third transistor M3 is electrically connected to the reset terminal R1, the first electrode of the third transistor M3 is electrically connected to the pull-up node PU, and the second electrode of the third transistor M3 is electrically connected to the first low voltage terminal LVGL;

The gate electrode of the fourth transistor M4 is electrically connected to the frame reset terminal TRST, the first electrode of the fourth transistor M4 is electrically connected to the pull-up node PU, and the second electrode of the fourth transistor M4 is electrically connected to the first low voltage terminal LVGL;

The input circuit 12 includes a fifth transistor M5;

The gate electrode of the fifth transistor M5 and the first electrode of the fifth transistor M5 are both electrically connected to the input terminal I1, and the second electrode of the fifth transistor is electrically connected to the pull-up node PU;

The first output noise reduction circuit 13 includes a sixth transistor M6 and a seventh transistor M7;

The gate electrode of the sixth transistor M6 is electrically connected to the first pull-down node PD1, the first electrode of the sixth transistor M6 is electrically connected to the driving signal output terminal Gout, and the second electrode of the sixth transistor M6 is electrically connected to the first low voltage terminal LVGL;

The gate electrode of the seventh transistor M7 is electrically connected to the second pull-down node PD2, the first electrode of the seventh transistor M7 is electrically connected to the driving signal output terminal Gout, and the second electrode of the seventh transistor M7 is electrically connected to the first low voltage terminal LVGL;

The pull-down node noise reduction circuit 14 includes an eighth transistor M8, a ninth transistor M9, a tenth transistor M10, and an eleventh transistor M11; the pull-down node includes a first pull-down node PD1 and a second pull-down node PD2; the pull-down node noise reduction control terminal includes the pull-up node PU and the input terminal I1;

The gate electrode of the eighth transistor M8 is electrically connected to the pull-up node PU, the first electrode of the eighth transistor M8 is electrically connected to the first pull-down node PD1, and the second electrode of the eighth transistor M8 is electrically connected to the first low voltage terminal LVGL;

The gate electrode of the ninth transistor M9 is electrically connected to the input terminal I1, the first electrode of the ninth transistor M9 is electrically connected to the first pull-down node PD1, and the second electrode of the ninth transistor M9 is electrically connected to the first low voltage terminal LVGL;

The gate electrode of the tenth transistor M10 is electrically connected to the pull-up node PU, the first electrode of the tenth transistor M10 is electrically connected to the second pull-down node PD2, and the second electrode of the tenth transistor M10 is electrically connected to the first low voltage terminal LVGL;

The gate electrode of the eleventh transistor M11 is electrically connected to the input terminal I1, the first electrode of the eleventh transistor M11 is electrically connected to the second pull-down node PD2, and the second electrode of the eleventh transistor M11 is electrically connected to the first low voltage terminal LVGL;

The pull-down node control circuit 23 includes a fourteenth transistor M14 and a fifteenth transistor M15;

The gate electrode of the fourteenth transistor M14 and the first electrode of the fourteenth transistor M14 are electrically connected to the first control voltage terminal VDDo, and the second electrode of the fourteenth transistor M14 is electrically connected to the pull-up Node PU;

The gate electrode of the fifteenth transistor M15 and the first electrode of the fifteenth transistor M15 are electrically connected to the second control voltage terminal VDDe, and the second electrode of the fifteenth transistor M15 is connected to the pull-up Node PU;

The output circuit 22 includes a seventeenth transistor M17;

The gate electrode of the seventeenth transistor M17 is electrically connected to the pull-up node PU, and the first electrode of the seventeenth transistor M17 is electrically connected to the first clock signal terminal CLK, and the second electrode of the seventeenth transistor M17 is electrically connected to the driving signal output terminal Gout.

In at least one embodiment of the driving circuit shown in FIG. 17, all transistors are n-type transistors, but are not limited to this.

In at least one embodiment of the driving circuit shown in FIG. 17, the source-drain floating processing can be performed on at least one of M1, M2, M3, M4, M5, M6, M7, M8, M9, M10, and M11.

An embodiment of the present disclosure provides a display device including the above driving circuit.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising a pull-up node noise reduction circuit, an input circuit, a first output noise reduction circuit and a pull-down node noise reduction circuit; wherein the pull-up node noise reduction circuit is electrically connected to a pull-up node, a pull-up node noise reduction control terminal and a first voltage terminal, and the pull-up node noise reduction circuit is configured to control to connect the pull-up node and the first voltage terminal under the control of a pull-up node noise reduction control signal provided by the pull-up node noise reduction control terminal;

the input circuit is electrically connected to an input terminal and the pull-up node respectively, and is configured to control a potential of the pull-up node under the control of an input signal provided by the input terminal;

the first output noise reduction circuit is electrically connected to a pull-down node, an output terminal and a second voltage terminal respectively, and is configured to connect the output terminal and the second voltage terminal under the control of a potential of the pull-down node;

the pull-down node noise reduction circuit is electrically connected to the pull-down node, the pull-down node noise reduction control terminal and a third voltage terminal respectively, and is configured to control to connect the pull-down node and the third voltage terminal under the control of a pull-down node noise reduction control signal provided by the pull-down node noise reduction control terminal;

at least one transistor comprised in the driving circuit is a floating processing transistor, the floating processing transistor comprises a floating electrode, a gate electrode, a first electrode and a second electrode; the floating electrode and at least one of the first electrode and the second electrode of the floating processing transistor are arranged in a same layer; the floating electrode is arranged between the first electrode and the second electrode of the floating processing transistor, and the floating electrode has no electrical signal input; a shortest distance between the first electrode of the floating processing transistor and the second electrode of the floating processing transistor is greater than an initial distance;

wherein the pull-down node noise reduction circuit comprises an eighth transistor, a ninth transistor, a tenth transistor, and an eleventh transistor; the pull-down node comprises a first pull-down node and a second pull-down node; the pull-down node noise reduction control terminal comprises the pull-up node and the input terminal;

a gate electrode of the eighth transistor is electrically connected to the pull-up node, a first electrode of the eighth transistor is electrically connected to the first pull-down node, and a second electrode of the eighth transistor is electrically connected to the third voltage terminal;

a gate electrode of the ninth transistor is electrically connected to the input terminal, a first electrode of the ninth transistor is electrically connected to the first pull-down node, and a second electrode of the ninth transistor is electrically connected to the third voltage terminal;

a gate electrode of the tenth transistor is electrically connected to the pull-up node, a first electrode of the tenth transistor is electrically connected to the second pull-down node, and a second electrode of the tenth transistor is electrically connected to the third voltage terminal;

a gate electrode of the eleventh transistor is electrically connected to the input terminal, a first electrode of the eleventh transistor is electrically connected to the second pull-down node, and a second electrode of the eleventh transistor is electrically connected to the third voltage terminal;

at least one of the eighth transistor, the ninth transistor, the tenth transistor, and the eleventh transistor is a floating processing transistor.

2. The driving circuit according to claim 1, wherein at least one of the pull-up node noise reduction circuit, the input circuit, the first output noise reduction circuit, and the pull-down node noise reduction circuit comprises the floating processing transistor, the floating processing transistor comprises A floating electrodes, A is greater than or equal to 1 and less than or equal to 3.

3. The driving circuit according to claim 2, wherein the floating electrode, the first electrode and the second electrode of the floating processing transistor are located together on a first metal layer;

a shortest distance between the first electrode and the second electrode is greater than or equal to a first distance and less than or equal to a second distance;

the first distance is a difference between the initial distance and 3 μm, and the second distance is a sum of the initial distance and 3 um.

4. The driving circuit according to claim 1, wherein the output terminal is a carry signal output terminal;

the input terminal is an adjacent previous M stage of carry signal output terminal, and M is a positive integer.

5. The driving circuit according to claim 4, wherein the pull-up node noise reduction control terminal comprises the first pull-down node, the second pull-down node, a reset terminal and a frame reset terminal; the reset terminal is an adjacent next N stage of carry signal output terminal, N is a positive integer;

the pull-up node noise reduction circuit comprises a first transistor, a second transistor, a third transistor and a fourth transistor;

a gate electrode of the first transistor is electrically connected to the first pull-down node, a first electrode of the first transistor is electrically connected to the pull-up node, and a second electrode of the first transistor is electrically connected to the first voltage terminal;

a gate electrode of the second transistor is electrically connected to the second pull-down node, a first electrode of the second transistor is electrically connected to the pull-up node, and a second electrode of the second transistor is electrically connected to the first voltage terminal;

a gate electrode of the third transistor is electrically connected to the reset terminal, a first electrode of the third transistor is electrically connected to the pull-up node, and a second electrode of the third transistor is electrically connected to the first voltage terminal;

a gate electrode of the fourth transistor is electrically connected to the frame reset terminal, a first electrode of the fourth transistor is electrically connected to the pull-up node, and a second electrode of the fourth transistor is electrically connected to the first voltage terminal;

at least one of the first transistor, the second transistor, the third transistor, and the fourth transistor is a floating processing transistor.

6. The driving circuit according to claim 4, wherein the input circuit comprises a fifth transistor;

a gate electrode of the fifth transistor and a first electrode of the fifth transistor are both electrically connected to the input terminal, and a second electrode of the fifth transistor is electrically connected to the pull-up node;

the fifth transistor is a floating processing transistor.

7. The driving circuit according to claim 4, wherein the first output noise reduction circuit comprises a sixth transistor and a seventh transistor;

a gate electrode of the sixth transistor is electrically connected to the first pull-down node, a first electrode of the sixth transistor is electrically connected to the output terminal, and a second electrode of the sixth transistor is electrically connected to the second voltage terminal;

a gate electrode of the seventh transistor is electrically connected to the second pull-down node, a first electrode of the seventh transistor is electrically connected to the output terminal, and a second electrode of the seventh transistor is electrically connected to the second voltage terminal;

at least one of the sixth transistor and the seventh transistor is a floating processing transistor.

8. The driving circuit according to claim 4, further comprising a second output noise reduction circuit, an output circuit and a pull-down node control circuit; wherein the second output noise reduction circuit is electrically connected to the first pull-down node, the second pull-down node, the driving signal output terminal and the fourth voltage terminal respectively, and is configured to control to connect the driving signal output terminal and a fourth voltage terminal under the control of the potential of the first pull-down node, and control to connect the driving signal output terminal and the fourth voltage terminal under the control of the potential of the second pull-down node;

the pull-down node control circuit is electrically connected to the first pull-down node and the second pull-down node respectively, and is configured to control the potential of the first pull-down node and the potential of the second pull-down node;

the output circuit is electrically connected to the pull-up node, the first clock signal terminal, the carry signal output terminal and the driving signal output terminal respectively, and is configured to control to connect the carry signal output terminal and the first clock signal terminal and control to connect the driving signal output terminal and the first clock signal terminal under the control of the potential of the pull-up node.

9. The driving circuit according to claim 8, wherein the pull-down node control circuit is further electrically connected to the first control voltage terminal and the second control voltage terminal, respectively, is configured to control to connect the first pull-down node and the first control voltage terminal under the control of the first control voltage provided by the first control voltage terminal, and control to connect the second pull-down node and the second control voltage terminal under the control of the second control voltage provided by the second control voltage terminal.

10. The driving circuit according to claim 8, wherein the pull-down node control circuit is further electrically connected to the first clock signal terminal and the second clock signal terminal respectively, is configured to control to connect the first pull-down node and the second clock signal terminal under the control of the second clock signal provided by the second clock signal terminal, and control to connect the second pull-down node and the first clock signal terminal under the control of the first clock signal provided by the first clock signal terminal.

11. The driving circuit according to claim 1, wherein the output terminal is a driving signal output terminal;

the input terminal is an adjacent previous M stage of driving signal output terminal, and M is a positive integer.

12. The driving circuit according to claim 11, wherein the pull-up node noise reduction control terminal comprises the first pull-down node, the second pull-down node, a reset terminal and a frame reset terminal; the reset terminal is an adjacent next N stage of driving signal output terminal, N is a positive integer;

the pull-up node noise reduction circuit comprises a first transistor, a second transistor, a third transistor and a fourth transistor;

a gate electrode of the first transistor is electrically connected to the first pull-down node, a first electrode of the first transistor is electrically connected to the pull-up node, and a second electrode of the first transistor is electrically connected to the first voltage terminal;

a gate electrode of the second transistor is electrically connected to the second pull-down node, a first electrode of the second transistor is electrically connected to the pull-up node, and a second electrode of the second transistor is electrically connected to the first voltage terminal;

a gate electrode of the third transistor is electrically connected to the reset terminal, a first electrode of the third transistor is electrically connected to the pull-up node, and a second electrode of the third transistor is electrically connected to the first voltage terminal;

a gate electrode of the fourth transistor is electrically connected to the frame reset terminal, a first electrode of the fourth transistor is electrically connected to the pull-up node, and a second electrode of the fourth transistor is electrically connected to the first voltage terminal;

at least one of the first transistor, the second transistor, the third transistor, and the fourth transistor is a floating processing transistor.

13. The driving circuit according to claim 11, wherein the input circuit comprises a fifth transistor;

a gate electrode of the fifth transistor and a first electrode of the fifth transistor are both electrically connected to the input terminal, and a second electrode of the fifth transistor is electrically connected to the pull-up node;

the fifth transistor is a floating processing transistor.

14. The driving circuit according to claim 11, wherein the first output noise reduction circuit comprises a sixth transistor and a seventh transistor;

a gate electrode of the sixth transistor is electrically connected to the first pull-down node, a first electrode of the sixth transistor is electrically connected to the output terminal, and a second electrode of the sixth transistor is electrically connected to the second voltage terminal;

a gate electrode of the seventh transistor is electrically connected to the second pull-down node, a first electrode of the seventh transistor is electrically connected to the output terminal, and a second electrode of the seventh transistor is electrically connected to the second voltage terminal;

at least one of the sixth transistor and the seventh transistor is a floating processing transistor.

15. The driving circuit according to claim 11, further comprising an output circuit and a pull-down node control circuit; wherein the pull-down node control circuit is electrically connected to the first pull-down node and the second pull-down node respectively, and is configured to control the potential of the first pull-down node and the potential of the second pull-down node;

the output circuit is electrically connected to the pull-up node, the first clock signal terminal and the driving signal output terminal respectively, and is configured to control to connect the driving signal output terminal and the first clock signal terminal under the control of the potential of the pull-up node.

16. The driving circuit according to claim 15, wherein the pull-down node control circuit is further electrically connected to the first control voltage terminal and the second control voltage terminal, respectively, is configured to control to connect the first pull-down node and the first control voltage terminal under the control of the first control voltage provided by the first control voltage terminal, and control to connect the second pull-down node and the second control voltage terminal under the control of the second control voltage provided by the second control voltage terminal.

17. The driving circuit according to claim 15, wherein the pull-down node control circuit is further electrically connected to the first clock signal terminal and the second clock signal terminal respectively, is configured to control to connect the first pull-down node and the second clock signal terminal under the control of the second clock signal provided by the second clock signal terminal, and control to connect the second pull-down node and the first clock signal terminal under the control of the first clock signal provided by the first clock signal terminal.

18. A display device comprising the driving circuit according to claim 1.

* * * * *